J. BESSO.
EXTRACTING OILS.
No. 66,119. Patented June 25, 1867.
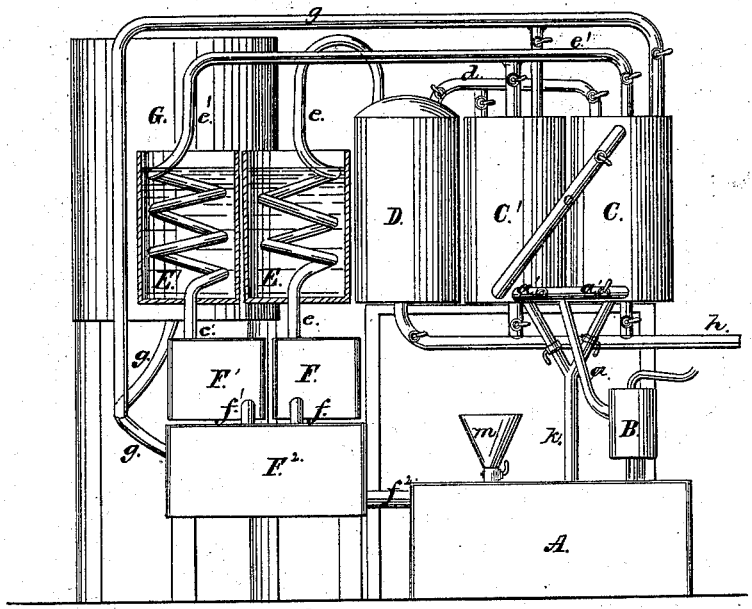
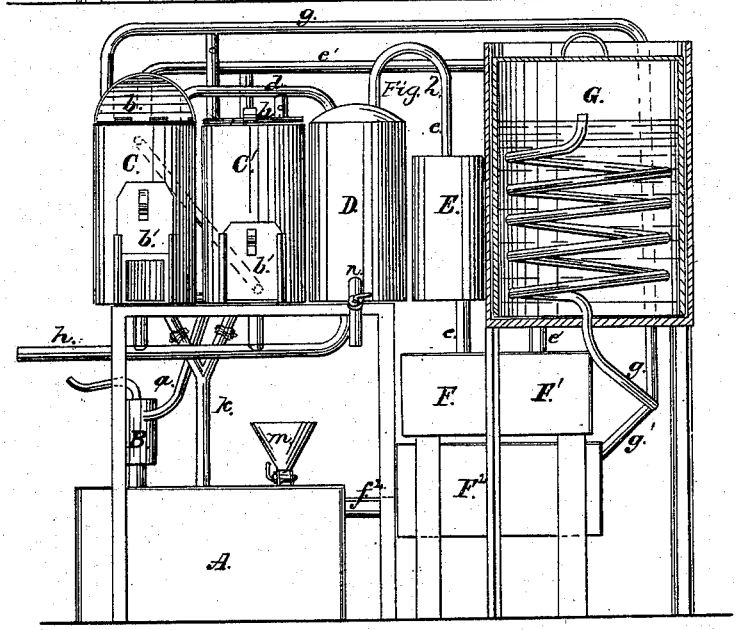

United States Patent Office.

JOSEPH BESSO, OF PHILADELPHIA, PENNSYLVANIA.

Letters Patent No. 66,119, dated June 25, 1867.

---

IMPROVEMENT IN EXTRACTING GREASE AND OILS FROM ANIMAL AND VEGETABLE SUBSTANCES.

---

The Schedule referred to in these Letters Patent and making part of the same.

---

TO ALL WHOM IT MAY CONCERN:

Be it known that I, JOSEPH BESSO, of Philadelphia, in the county of Philadelphia, and State of Pennsylvania, have invented a new and improved Process for Extracting and Separating Grease and Oils from Animal and Vegetable Substances; and I do hereby declare that the following is a full, clear, and exact description thereof, which will enable those skilled in the art to make and use the same, reference being had to the accompanying drawings, forming part of this specification, in which—

Figure 1 represents one side of the apparatus of my invention for my improved process of extracting grease and oils from animal and vegetable substances, partly in section.

Figure 2 represents the opposite side of the same, also partly in section.

Similar letters of reference indicate corresponding parts.

This invention relates to an improved process of separating and extracting the oils and fatty matter contained in unwashed wool, bones, oil-cake, seeds, or other animal and vegetable substances, whereby wool, especially, is thoroughly cleansed and purified, and the oil it may contain is separated and utilized with great economy, instead of being wasted and lost, at great cost, in the ordinary method of washing and cleansing wool with soap.

This invention consists in a new and improved method of treating animal and vegetable substances, by the application of bisulphuret of carbon, in combination with steam, whereby the oils and fatty matters are thoroughly extracted from those substances by means of apparatus and operations therewith hereinafter more particularly described. The apparatus I employ for this purpose is made wholly of iron, and consists of a series of cylinders and vessels connected with each other by pipes as represented in the drawings, in which—

A is a reservoir, for containing bisulphuret of carbon, ($CS^2$,) in which is placed a force-pump, B, connected by the supply pipe $a$ with hollow cylinders or retorts C C', which contain the wool or other substance to be treated or digested, and which may be one or more in number as required, of any convenient size, according to the extent of operations. The digesting retorts C C' are provided with doors $b$ on the top, for charging, and $b'$ at the bottom for discharging the substances treated, and these doors are fitted and packed to be as nearly air-tight as possible. The main supply pipe $a$, leading from the force-pump B, is connected with the digesting retorts, at the bottom of each, by branch pipes $a'$, each of which branch pipes is provided with stop-cocks. The retorts C C' are also connected with each other by a pipe, $c$, running from the top of C to the bottom of C', and provided also with a stop-cock. The digesting retorts C C' are connected by a pipe, $d$, with another hollow cylinder, D, which serves as a still or alembic, as subsequently explained. The pipe $d$ and its branches, connected with the retorts C C', are each provided also with stop-cocks for placing the alembic D in communication with the retorts C C', either separately or together, as may be necessary. A cooler, E, is connected with the alembic D by a pipe, $e$, that passes down in a coil through the cooler, as shown in fig. 1, to a receiving vessel, F, placed below the cooler; and a cooler, E', is connected with the retorts C C' by a pipe, $e'$, which also leads down in a coil through the cooler to a receiving vessel, F', underneath. The receiving vessels F F' are connected by pipes $f f'$ with another receiving vessel, $F^2$, placed at a lower level, but higher than the reservoir A, into which a pipe, $f^2$, leads from it. A gasometer, G, is connected with the digesting retorts C C' by a pipe, $g$, which leads from the top of the retorts into the bottom of the gasometer, within which it terminates in a coil, to serve as a condenser, as shown in fig. 2, and subsequently explained. The pipe $g$ is also connected by a branch, $g'$, with the lowest receiving vessel $F^2$. A steam pipe, $h$, leads from a steam boiler to the digesting retorts C C' and the alembic D, and is provided with stop-cocks for each.

The method of operation is as follows: The reservoir A is charged with bisulphuret of carbon, through the funnel $m$, and the digesting retorts C C', or as many as may be employed, are filled with wool or other substance to be treated. The first retort C in the series of retorts is put in communication with the force-pump B, the stop-cocks connecting the pipe $a$ with the retort C', and on the pipes above being all closed except pipe $g$, the bisulphuret of carbon is then forced up to the top of the retort C, and down through the pipe $c$, to the bottom of C', thence up through it into the alembic D, through the pipe $d$, which, at the proper time, is opened to put them in communication. The pipe $g$ is open during this operation, for the purpose of allowing the air to pass off from the retorts, when they are filled with bisulphuret of carbon, into the gasometer G. The bisulphuret of carbon is thus forced through the wool or other substance in the retorts C C', and thoroughly incorporated therewith, to digest and separate the oils and fatty matter which pass over with the liquid under the pressure of the force-pump into the alembic D. This operation is continued until the grease and other extraneous matters are thoroughly discharged from the wool or other substance under treatment, and the liquid bisulphuret of carbon passes, without discoloration, into the alembic. After this operation is completed, the pipe $k$, which connects the bottom of the retorts C C' with the reservoir A, is opened, and the bisulphuret of carbon remaining in the retorts runs back into the reservoir. The pipe $k$ is again closed; the pipes $d$ and $g$ are also cut off in their communication with the retorts, and the pipe $e'$, connecting them with the cooler E', is opened. Steam is then let on through the pipe $h$, to blow through the retorts C C' and the alembic D, which, at a temperature of 45° centigrade, will convert the bisulphuret of carbon into a gas, and carry it over in this form through the connecting pipes $e$ $e'$, from the retorts and the alembic, into the coolers E E', where it is condensed by cool water kept in them around the coils, and then, in a liquid form, again falls into the receivers F $F^1$, thence into the receiver $F^2$, and back again into the reservoir A. The bisulphuret of carbon being heavier than water, any excess of water of condensation will flow out of the top of the reservoir through an opening left for the purpose. The bisulphuret of carbon which may escape in a gaseous form through the pipe $g$ into the gasometer will be condensed therein and return by the branch pipe $g'$ into the receiver $F^2$. The bisulphuret of carbon is thus all separated in a gaseous form from all the substances under treatment, after performing its work, and is returned to the reservoir in a liquid form again without material loss, when care is exercised in the operation, to be used over repeatedly with a fresh batch of material. The oils and fatty matters remaining in the alembic D are to be drawn off through a faucet, $n$, provided for the purpose, (fig. 2.)

Having thus described my invention, and the means of carrying it into practical operation, what I claim as new, and desire to secure by Letters Patent, is—

1. The improved apparatus, consisting of the reservoir A, the force-pump B, the retorts C C', the alembic D, the condensing vessels E E', the receiving vessels F $F^1$ $F^2$, the gasometer G, and the steam pipe $h$, combined, arranged, and operating substantially as and for the purpose herein described.

2. The force-pump B, in combination with the reservoir A and the retorts C C' arranged and operating as and for the purpose herein set forth.

3. The gasometer G, in combination with the pipe $g$ and the retorts C C', arranged as and for the purposes specified.

The above specification of my invention signed by me this 18th day of May, 1867.

JOSEPH BESSO.

Witnesses:
WM. F. MCNAMARA,
ALEX. F. ROBERTS.